Dec. 19, 1933.  M. OSNOS  1,940,437

ELECTRICAL NETWORK

Filed June 4, 1931

INVENTOR
MENDEL OSNOS
BY
ATTORNEY

Patented Dec. 19, 1933

1,940,437

UNITED STATES PATENT OFFICE 1,940,437

ELECTRICAL NETWORK

Mendel Osnos, Berlin, Germany, assignor to Telefunken Gesellschaft für Drahtlose Telegraphie m. b. H., Berlin, Germany, a corporation of Germany Application June 4, 1931, Serial No. 542,062, and in Germany June 25, 1929

3 Claims. (Cl. 171—119)

This invention relates broadly to the design of transducers adapted to be disposed between an alternating current source and any utilizing circuit and more particularly to ways and means for suitably determining the various components, such as condensers, transformers, and the like, which are utilized in an electrical network.

An object of the invention is to design such transducers for producing certain results at a minimum cost of installation and operation.

It is another object of the invention to set forth a method of designing power factor correcting systems utilizing condensers, inductances, etc. for performing their functions at a minimum cost.

Another object of this invention is to minimize the aggregate volt-ampere consumption of the primary and secondary circuits of an electrical network in order to cut down the size and hence the cost of the condensers in use to a minimum.

In the above and in what follows, the term "transducer" is used to designate any network of reactances which receives energy in one pair of terminals and delivers it usually at a different voltage out of another pair of terminals.

Other objects of the invention will be apparent from a reading of the following detailed specification and claims.

The invention will be described in connection with the appended drawing in which.

Figure 1:
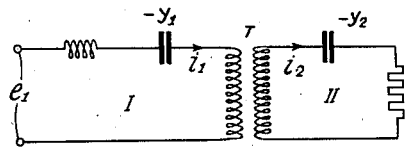
Figure 1 illustrates diagrammatically an alternating current system having inductance and capacitance connected therein coupled through a transformer to a utilizing circuit.

The phase angle between current $i_1$ and potential $e_1$ in an alternating current plant or system comprising a transformer T and condensers (see e. g., Fig. 1) is generally expressible by this equation:

$$\cos \phi_1 = F(r_1, r_2, x_1, x_2, x_{12}, y_1, y_2)$$

where $\phi_1$ the phase (displacement) angle between current $i_1$ and potential or E. M. F. $e_1$ of the primary circuit, $r_1$ its non-reactive resistance, $x_1$ its inductive reactance and $-y_1$ its capacitive reactance; further, $r_2$ and $x_2$ and $y_2$ the non-reactive resistance, inductive and capacitive reactances, respectively, of the secondary circuit, and $x_{12}=\omega M$ the coupling reactance of the transformer due to mutual inductance M of the primary and secondary windings.

Quantities $r_1$, $r_2$ and the coupling factors $$\frac{x_{12}}{x_1}=v_1$$

and $$\frac{x_{12}}{x_2}=v_2$$

are mostly given by and inherent in the type of construction of the machine and the transformer, the size of the whole installation, and the useful power or output, so that $\cos \phi_1$ can be regarded as a function of three independent variables, say, $x_2$, $y_1$ and $y_2$.

For any desired phase angle $\phi_1$ two of these quantities may be chosen at will; the point, however, is to choose them most favorably.

According to this invention, they should be so selected that, for a given secondary power and primary phase angle $\phi_1$ the sum total of the primary and the secondary volt-amperes, consumption VA of the condensers should be as low as feasible. As found from exhaustive investigation, the values of the available variables should be chosen as follows:

Case a

Suppose $x_2$ is given and $y_2$ is to be chosen ad libitum. Then denoting by $s=1-v_1 v_2$ the general leakage factor, then quantity $x_1''=sx_2$ represents a quantity likewise given by the given constants of the plant. In what follows this quantity shall be designated as the "ideal inductance" referred to the secondary circuit."

Now, in order to obtain a minimum of VA consumption of the condensers in the plant, for given $x_2$, the condensers of the secondary circuit must be so chosen that their capacitance (capacitive reactance) $y_2$ will neutralize the said ideal inductance $x_1''$ referred or reduced to the secondary circuit; in other words, there should be:

$$y_2=sx_2 \quad (1)$$

After quantity $y_2$ has thus been chosen, the condensers (or the capacitance $y_1$) on the primary side are so chosen or adjusted that the phase angle $\phi_1$ will be of the desired amount.

Case b $y_2$ be given and $x_2$ to be chosen at will. In this instance, quantity $x_2$ must be so fixed in order that the condenser VA consumption may be minimized, that this equation is fulfilled:

$$x_2 = \sqrt{\frac{r_2^2 + y_2^2}{s}} \quad (2)$$

However, in the cases previously indicated what is obtained is merely a relative minimum for the condenser VA consumption inasmuch as one of the quantities $x_2$ or $y_2$ is already given or fixed for some reason or another.

The "smallest" minimum of the condenser VA consumption for a given size of $\phi_1$, however, is realized in

*Case c* when both $x_2$ as well as $y_2$ are to be chosen at will. These quantities are so selected that Equations (1) and (2) are simultaneously obeyed. Then $$y_2 = r_2 \sqrt{\frac{s}{1-s}} \quad (3)$$

and $$x_2 = \frac{r_2}{\sqrt{s(1-s)}} \quad (4)$$

As can be seen from Equations (1) and (4), $y_2$ and $x_2$ are entirely independent of the primary phase angle $\phi_1$, i. e., of the desired degree of phase compensation. But $y_1$ is dependent upon the primary phase angle, indeed, calculation shows that in case $a$ $$y_{1,a} = \frac{x_1}{1 + (v_1 v_2 \cot \delta_2)^2} - x_0 \quad (5)$$

where $$\delta_2 = \tan^{-1} \frac{r_2}{x_2}$$

and $$x_0 = x_1 \frac{v_1 v_2 \cot \delta_2 \tan \phi_1}{1 + (v_1 v_2 \cot \delta_2)^2} \quad (6)$$

In case $b$ $$y_{1,b} = x_1 \frac{2s - (1+s)\sqrt{s} \sin \epsilon_2}{1 + s - 2\sqrt{s} \sin \epsilon_2} - x_0 \quad (7)$$

where $$\epsilon_2 = \tan^{-1} \frac{y_2}{x_2}$$

and $$x_0 = x_1 \tan \phi_1 \frac{(1-s)\sqrt{s} \cos \epsilon_2}{1 + s - 2\sqrt{s} \sin \epsilon_2} \quad (8)$$

In case $c$ $$y_{1,c} = s x_1 - x_0 \quad (9)$$

where $$x_0 = x_1 \tan \phi_1 \sqrt{s(1-s)} \quad (10)$$

It can be proved that $x_0$ is equal to that part or fraction of the aggregate reactance $x_1$ of the primary circuit which, for some reason or another, say, with a view to insure a suitable load of the alternator, is to be maintained in the primary circuit and is not to be compensated. Designating the difference $s x_1 - x_0$ occurring on the right-hand side of Equation (9) determined by all given reactance of the plant as well as the requisite residual reactance $x_0$, as the "ideal inductance reduced to the primary circuit", then Equation (9) enounces that the condensers of the primary circuit should be so chosen that their capacitance $y_{1,c}$, compensates and neutralizes the inductance of the plant referred to the primary circuit. On the other hand, however, as previously pointed out, reactance $y_2$ is to be so chosen according to Equation (1) that thereby the "ideal inductance referred to the secondary circuit" will be compensated. Hence, the tuning required for maintaining the absolute minimum for the condenser VA consumption, for given $\phi_1$, may be indicated as follows:

In order that for a definite useful power, in the presence of a given $\phi_1$, an absolute minimum may be obtained for the condenser VA consumption, then the capacities in the different circuits of the transformers should be so distributed that in each circuit the "ideal inductance referred to this circuit" will be neutralized by the capacity in the same circuit.

A balanced or tuned condition as here suggested is readily realizable in practice. For the adjustment of $y_1$ in the secondary circuit both the useful resistance $r_2$ as well as such capacitance as may exist should be short-circuited. The condenser in the primary circuit is so set that only a residual amount will remain active in the inductance $x_0$. Thereupon, for the setting of the secondary condenser, the machine in the primary circuit is rendered "dead" and the primary condenser is short-circuited. The inductance of the alternator, however, must in the primary circuit be maintained at its normal value corresponding to the load. In the secondary circuit the short-circuiting of the secondary condenser is discontinued, and instead of the useful resistance $r_2$ a suitable potential $e_2$ is applied. Then $y_2$ is altered until the load of potential $e_2$ is completely compensated, in other words, until the current in the secondary circuit is in phase with the terminal potential $e_2$ of this circuit.

Figure 2:
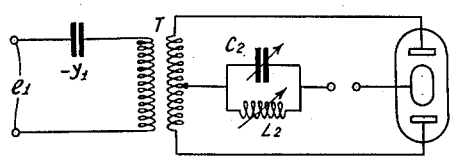
Figure 2 illustrates diagrammatically an alternating current system coupled through a transformer to a rectifier circuit.

What is to be inferred from the above is that, if the condenser VA consumption is to be of a minimum amount for a given power, it is absolutely necessary to include both primary and secondary capacities. However, technical conditions of the service do not always readily admit of connecting condensers in the secondary circuit of a transformer. This would be true, for instance, of the feeding of rectifiers seeing that the rectified current is unable to flow across the condensers. In a case like that the said difficulty is to be obviated by that, as shown in Fig. 2, a combined capacitance comprising, e. g., a condenser $C_2$, and an inductance $L_2$ connected in parallel therewith, is used.

Figure 3:
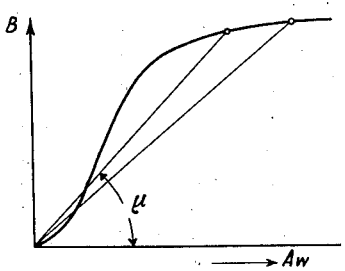
Figures 3 and 4 are curves illustrating certain conditions existing in the circuits to be described.

The following may further be said in this place respecting the variability of the transformer constants:

In the case of an air-core transformer the leakage factor $s_i$ is constant, but in an iron-cored transformer it is dependent upon the extent of magnetic saturation, mostly in such a way that with higher saturation the stray exhibits an increase. This is due to that one works ordinarily above the knee of the magnetizing curve (see Fig. 3) where the permeability of the iron decreases as the current increases. As a result the condenser VA consumption will generally grow at a faster rate than in direct proportion to the load $(i_2)^2 r_2$.

Figure 4:
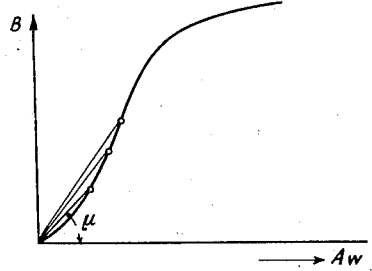

In order to obviate this inconvenience the iron-cored transformers should most suitably be so chosen that they work essentially in the range lying below the knee of the magnetizing curve (see Fig. 4), so that with growing current of the transformer the permeability will not only not decrease, but will, on the contrary, increase.

Figure 5:
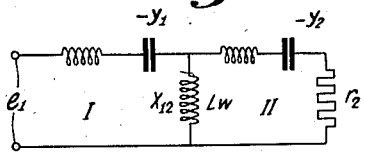
Figure 5 illustrates diagrammatically an alternating current supply system coupled to a particular load circuit in accordance with my invention; and, Figures 6, 7 and 8 illustrate other modifications of the invention.

Of course, nothing will be altered in the formulae and rules above indicated, if the transformer is made of the single-coil type, or if it is even replaced by an interposed inductance L, in a way as shown in Fig. 5. In that case, the coupling resistance $x_{12}$ is denoted by the quantity $\omega L$.

The rules hereinbefore outlined for the proper proportioning of a plant hold good for series resistances.

Now, if anyone of the resistances in the transformer circuit is not simply connected in series, but is indirectly connected (magnetically, electrically or galvanically), then the series resistance in the sense of this invention is the equivalent series resistance referred to this transformer winding.

Figure 6:
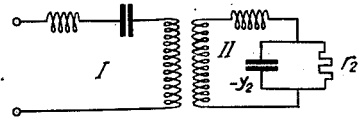

For instance, when the secondary capacitive reactance $-y_2$ is connected in parallel relation to the non-reactive resistance $r_2$ (see Fig. 6), there will have to be regarded as the capacitive reactance $-y'_2$ in the sense of this invention the capacitance of the equivalent series circuit arrangement $$y'_2 = y_2 \frac{(r_2)^2}{(r_2)^2 + (y_2)^2}$$

while as the equivalent non-reactive resistance must be taken the value $$r'_2 = r_2 \frac{(y_2)^2}{(r_2)^2 + (y_2)^2}$$

Figure 7:
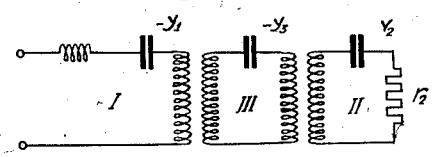

If furthermore the primary circuit and the consumer circuit are not directly coupled with each other, but are rather associated by one or more intermediate or link circuits (see, for instance, Fig. 7), then in the sense of this invention, all of the circuits coming to act upon a circuit may, as is well known, be imagined as being replaced by a single circuit of the same aggregate action. Also in this instance, the "ideal inductance reduced to a definite circuit" is easily obtainable. For example, in the case of the primary circuit of Fig. 7 there is to be regarded as the ideal inductance referred to this circuit the difference $x'_1 - x_0$ where $x_0$ again the requisite residual inductance, and $x'_1$ the resultant inductance measured in the first circuit, and which is obtained if in all three circuits the condensers are "shorted", and in the third circuit in addition the consumer resistance $r_2$. Similarly, for the intermediate circuit III the ideal inductance referred to this circuit is obtained if the capacity $-y_3$ in the same is replaced by a suitable potential, if in the consuming circuit II both the condenser as well as $r_2$ are short-circuited, and if finally in the primary circuit the capacity is short-circuited and the machine potential disconnected, without its inductance being disconnected from this circuit.

In an analogous manner one may proceed in reference to the consuming circuit. Also for this circuit the ideal inductance referred thereto resides in its inherent inductance plus the reactance transferred to the said consuming circuit from the other circuits of the plant (in the presence of capacities short-circuited therein and disconnected machine potential, though existent machine inductance).

Figure 8:
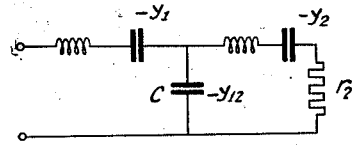

In the starting scheme shown in Fig. 1, the presupposition had been made that the two circuits are inter-coupled inductively by the aid of a transformer. However, it is also possible to inter-couple two circuits capacitively, as shown, for instance, in Fig. 8. This case leads to entirely analogous expressions and rules to those indicated above for cases a, b, c, if inductive and capacitive reactances are there interchanged, in other words, if each $y$ is replaced by $x$ with the same index, and if in lieu of the coupling resistance $x_{12} = \omega M$ there is now put as coupling resistance this quantity $$-y_{12} = -\frac{1}{\omega C}.$$

In this way similar and analogous rules are obtained for the purpose of insuring a minimum VA consumption in all inductances, for a given secondary power and phase angle $\phi 1$. For example, in analogy with case c the absolute minimum for the inductive VA (wattless) consumption will be found if the inductances are so chosen that in each and every circuit they will neutralize the ideal capacitive reactance referred to this circuit.

The invention is useful for all alternating current plants comprising capacities, and most particularly also for the circuits of a receiver equipment, for in the sense of this invention, also for such apparatus the main point is to minimize the wattless consumption of the inductances.

I claim:

1. In an electrical network a primary circuit including a source of alternating current and a secondary circuit including a load, means for coupling the primary and secondary circuits whereby energy from the source is transferred therethrough to the load, impedance elements in said secondary circuit including the load whereby the secondary circuit possesses inherent inductive reactance, capacitive reactance and non-reactive resistance, said impedance elements being proportioned so as to satisfy the following equation:

$$x_2 = \sqrt{\frac{r^2_2 + y^2_2}{s}}$$

where $x_2$ is the inductive reactance of the secondary circuit, $r_2$ the non-reactive resistance of the secondary circuit, $y_2$ the capacitive reactance of the secondary circuit and $s$ the leakage factor of the coupling means between the primary and secondary circuits.

2. In an electrical network for transforming alternating current into uni-directional current, a primary circuit including a source of alternating current, a capacitive reactance and the primary winding of a transformer in series, a secondary circuit including the secondary winding of said transformer, a rectifier device and a load, said primary and secondary windings being adapted to transfer energy from the source to the secondary circuit, impedance elements in said secondary circuit including the load whereby the secondary circuit possesses inherent inductive reactance, capacitive reactance and non-reactive resistance, said impedance elements being proportioned so as to satisfy the following equation:

$$x_2 = \sqrt{\frac{r^2_2 + y^2_2}{s}}$$

where $x_2$ is the inductive reactance of the secondary circuit, $r_2$ the non-reactive resistance of the secondary circuit, $y_2$ the capacitive reactance of the secondary circuit and $s$ the leakage factor of the coupling means between the primary and secondary circuits.

3. In an electrical network for changing alternating current into uni-directional current, a primary circuit including a source of alternating current, a condenser and the primary of a transformer in series, a secondary circuit including the secondary winding of said transformer, a rectifier device in said secondary circuit having an input side connected across the secondary winding of said transformer and an output side including a pair of output terminals and a capacitive reactance device, an inductive reactance device shunted across said capacitive reactance device to provide a direct current path across the capacitive reactance element, said secondary circuit having inherent inductive reactance, capacitive reactance and non-reactive resistance due to the said elements, said inductive reactance and capacitive reactance being proportioned by means of at least one of said devices so as to satisfy the following equation:

$$x_2 = \sqrt{\frac{r^2_2 + y^2_2}{s}}$$

where $x_2$ is the inductive reactance of the secondary circuit, $r_2$ the non-reactive resistance of the secondary circuit, $y_2$ the capacitive reactance of the secondary circuit and $s$ the leakage factor of the coupling means between the primary and secondary circuits.

MENDEL OSNOS.